US012723636B2

(12) United States Patent
Larsson et al.

(10) Patent No.: US 12,723,636 B2
(45) Date of Patent: Sep. 1, 2026

(54) COIL ASSEMBLY FOR AN ACTIVELY CONTROLLED DAMPING VALVE

(71) Applicant: Advanced Suspension Technology LLC, Northville, MI (US)

(72) Inventors: Fredrik Larsson, Jönköping (SE); Håkan Malmborg, Norrahammar (SE)

(73) Assignee: Advanced Suspension Technology LLC, Northville, MI (US)

( * ) Notice: Subject to any disclaimer, the term of this patent is extended or adjusted under 35 U.S.C. 154(b) by 338 days.

(21) Appl. No.: 18/703,475

(22) PCT Filed: Oct. 21, 2022

(86) PCT No.: PCT/EP2022/079433
§ 371 (c)(1),
(2) Date: Apr. 22, 2024

(87) PCT Pub. No.: WO2023/072770
PCT Pub. Date: May 4, 2023

(65) Prior Publication Data

US 2025/0237284 A1 Jul. 24, 2025

(30) Foreign Application Priority Data

Oct. 25, 2021 (EP) .................................... 21204491

(51) Int. Cl.
*F16F 9/32* (2006.01)

(52) U.S. Cl.
CPC ............ *F16F 9/325* (2013.01); *F16F 9/3271* (2013.01); *F16F 2226/04* (2013.01);
(Continued)

(58) Field of Classification Search
CPC ...... F16F 9/325; F16F 9/3271; F16F 2226/04; F16F 2230/0005; F16F 2230/0041; F16F 2230/0052; F16F 2230/30; F16F 2228/08
See application file for complete search history.

(56) References Cited

U.S. PATENT DOCUMENTS 3,787,791 A * 1/1974 Borger .................. H01F 7/1607 335/274
4,211,496 A * 7/1980 Naylor ..................... B41J 2/285 335/255
(Continued)

FOREIGN PATENT DOCUMENTS

DE 19624895 C1 12/1997
DE 10015911 A1 10/2001
(Continued)

OTHER PUBLICATIONS

International Search Report and Written Opinion of the ISA issued in PCT/EP2022/079433, mailed Feb. 23, 2023; ISA/EP.

*Primary Examiner* — John Bastianelli
(74) *Attorney, Agent, or Firm* — Harness, Dickey & Pierce, P.L.C.

(57) ABSTRACT

An actively controlled valve assembly and a method for assembling an actively controlled valve assembly comprising a coil housing, a valve housing, an intermediate member and a resilient locking member which is to be pre-tensioned into a pre-tensioning aperture, where the intermediate member comprises a guiding projection for pre-tensioning the resilient locking member which assures that it is brought into the correct position when the assembly is in the final assembled position where the resilient locking member is locked in a locking aperture of the valve housing.

15 Claims, 8 Drawing Sheets

(52) U.S. Cl.
CPC ................. *F16F 2230/0005* (2013.01); *F16F 2230/0041* (2013.01); *F16F 2230/0052* (2013.01); *F16F 2230/30* (2013.01)

(56) References Cited

U.S. PATENT DOCUMENTS

| | | | | |
|---|---|---|---|---|
| 6,044,939 | A | 4/2000 | Forster | |
| 2001/0038771 | A1 | 11/2001 | Wirth et al. | |
| 2004/0113730 | A1 | 6/2004 | Watanabe et al. | |
| 2017/0299009 | A1* | 10/2017 | Murakami | F16F 9/435 |
| 2018/0094692 | A1 | 4/2018 | Hase et al. | |

FOREIGN PATENT DOCUMENTS

| | | | |
|---|---|---|---|
| JP | 2014062584 | A | 4/2014 |
| JP | 2018204698 | A | 12/2018 |
| WO | 2018097148 | A1 | 5/2018 |

* cited by examiner 20
40
10
30

30
40
12
44

22
30
42

30
14
Pf
46
25

COIL ASSEMBLY FOR AN ACTIVELY CONTROLLED DAMPING VALVE

CROSS-REFERENCE TO RELATED APPLICATIONS

This application is a U.S. National Phase Application under 35 U.S.C. 371 of International Application No. PCT/EP2022/079433, filed on Oct. 21, 2022, which claims the benefit of European Patent Application No. 21204491.1, filed on Oct. 25, 2021. The entire disclosure of the aforementioned European patent application is incorporated herein by reference.

TECHNICAL FIELD

The present disclosure relates to an actively controlled damping valve assembly of a vehicle, and more particularly a coil assembly providing a pre-tensioned springing member. The present disclosure also relates to a method of mounting an actively controlled damping valve assembly.

BACKGROUND

Actively controlled dampers in vehicles often comprise a coil assembly for controlling the valve actuation. When assembling such a coil assembly to a valve housing of an actively controlled valve, it is conventionally fixated by means of a locking ring. Due to geometry of valve housings the coil assembly is blindly mounted into the housing. This sometimes results in an improper mounting which may cause deformations of the locking ring, problems with corrosion and/or vibrations of the details which may cause malfunction or generate noise.

It is therefore of interest to improve upon the conventional way of fixating a coil assembly to a valve housing.

SUMMARY

It is an object of the present invention to provide an improved solution that simplifies the way of fixating a coil assembly to a valve housing. In particular, a first object is to provide a coil assembly that is easy to fixate in a cavity of a valve housing of a damping valve assembly. A second object is to provide a method for easily fixating a coil assembly in a cavity of a valve housing of a damping valve assembly.

The invention is based on the inventors' realization that by redesigning the coil assembly to comprise a pre-tensioning locking member before the mounting, and providing guiding projections for receiving the pre-tensioned locking member in the correct position, the accuracy of the assembly may be increased.

According to a first aspect of the invention an actively controlled damping valve assembly for a vehicle is provided. The damping valve assembly comprises a valve housing with an inner surface, a coil housing with an outer surface for abutting said inner surface of the valve housing, and a resilient locking member for locking said valve housing to said coil housing in a final assembled position. The damping valve assembly further comprises an intermediate member for guiding and pre-tensioning said resilient locking member wherein the intermediate member comprises a guiding projection for guiding the resilient locking member into a pre-tensioned state in a pre-tensioning aperture of said outer surface of the coil housing when the coil housing is moved relative said intermediate member. Moreover, the inner surface of said valve housing comprises a locking aperture for receiving said resilient locking member when said valve housing is axially moved relative said coil housing into the final assembled position.

Hereby, an improved solution for fixating a coil assembly to a valve housing is provided. The design makes it not only easy to fixate in a cavity of a valve housing of a damping valve assembly, but also reduces the risk of improper mountings. By forming the mating surfaces with the guiding projection, the pre-tensioning of the resilient locking member will always be pre-tensioned in the same way. Also, the forming of the locking aperture will provide a person mounting the assembly with a clear feedback when the pieces are correctly mounted together in the final assembled position.

In the context of this application "an actively controlled damping valve assembly" should be understood as a valve assembly where a pressure, such as a pilot pressure, is actively controlled with an electrical actuator such as a solenoid or a step motor. In such the valve arrangements one may allow an actively controlled damping characteristics of a vehicle.

By vehicle, it may be meant e.g. a four-wheeled vehicle or a two-wheeled vehicle. It may mean an automobile. It may mean a bicycle or a motorcycle. It may mean a motocross-typed motorcycle.

By mating, it may be meant that an object A is adapted in shape and size to geometrically fit with an object B. For instance, object A may define a cylindric shape and object B have a rounded inner surface mating with the cylindrical shape.

According to one embodiment, the intermediate member is a bushing adapted to axially overlap a portion of the valve housing and a portion of the coil housing. Hereby, the intermediate member may accommodate a bottom portion of the coil housing and an upper portion of the valve housing.

According to yet one embodiment, the intermediate member comprises a first and a second inner surface wherein the first inner surface is adapted to abut an outer surface of the valve housing and the second inner surface is adapted to abut an upper outer surface of the coil housing.

Hereby, the intermediate member may have two different inner surfaces each being adapted to mate with a surface of the bottom portion of the coil housing and the upper portion of the valve housing, respectively.

In one embodiment, the first and second inner surfaces are circular surfaces. Hereby, the surfaces may be easy to manufacture and further be possible to assembly regardless of their rotational orientation, as long as being assembled coaxially about the circular surfaces.

According to yet one embodiment, the actively controlled damping valve assembly further comprises a first sealing member for sealing between the intermediate member and the coil housing. Hereby, e.g. dirt and moist may be kept outside the valve assembly, which ensures performance and technical lifetime.

According to one embodiment, the actively controlled damping valve assembly further comprises a second sealing member for sealing between the intermediate member and the valve housing. Hereby, e.g. dirt and moist may be kept outside the valve assembly, which ensures performance and technical lifetime.

According to one embodiment, the first sealing member is deformed when said valve housing is axially moved relative said coil housing into the final assembled position. Hereby, the sealing member may deform into the cavities in order to improve the sealing effect. The sealing member may also then function as a resilient member such that the mounting is held in place between a resilient force from the sealing member and the resilient locking member.

According to yet one embodiment, at least a portion of an outer surface of the valve housing and a portion of a mating inner surface of the intermediate member are coated with an anti-corrosion coating, such as cathodic dip coating. Hereby, the surfaces before the seal may be protected from corrosion which will provide a longer technical lifetime.

According to one embodiment, the resilient locking member is a spring wire product, such as a locking ring. Hereby, the locking member may be easily produced and fitted when mounted.

According to one embodiment, the resilient locking member is rotationally asymmetric. Hereby, the resilient locking member may be engaged and/or pre-tensioned differently depending on its rotational orientation relative the intermediate member.

According to one embodiment, the guiding projection has different radii along the circumference of the inner surface, so that said resilient locking member may be pretensioned by a relative rotation between the intermediate member and the resilient locking member.

According to one embodiment, the guiding projection is a guiding chamfer for guiding said resilient locking member into a pre-tensioned state into said aperture of said outer surface of the coil housing when the coil housing is axially moved towards said valve housing. Hereby, the form of the intermediate member's guiding projection will pretention the resilient locking member as a function of the axial movement during mounting.

According to a second aspect of the invention a vehicle comprising an actively controlled damping valve assembly according to any of the preceding embodiments is provided. The advantages and effects of such aspects are in large analogue to the advantages and effects of the valve assembly as described above.

According to a third aspect of the invention, method for mounting an actively controlled damping valve assembly is provided. The method comprises the steps of fitting a resilient locking member to an outer surface of a coil housing, inserting a valve housing into a first end of an intermediate member so that an outer surface of the valve housing abuts an inner surface of the intermediate member, inserting the coil housing into a second opposite end of the intermediate member, pre-tensioning the resilient locking member into a pre-tensioned state in a pre-tensioning aperture of said outer surface of the coil housing by moving the coil housing relative said intermediate member, axially moving the coil housing relative said valve hosing into a final assembled position, and receiving said resilient locking member into a locking aperture of said valve housing and thereby locking the coil hosing with the valve housing in the final assembled position.

According to one embodiment, the pre-tensioning aperture of said outer surface of the coil housing is axially aligned with said locking aperture of said valve housing in the final assembled position. Hereby, the person mounting the valve assembly will get a direct feedback on how much axial compression is needed to bring the resilient locking member axially in height with the locking aperture so that the valve housing is in the final assembled position.

According to one embodiment, the step of pre-tensioning the resilient locking member into a pre-tensioned state comprises rotating the intermediate member relative the resilient locking member.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein.

DESCRIPTION OF EMBODIMENTS

Figures 1A, 1B:
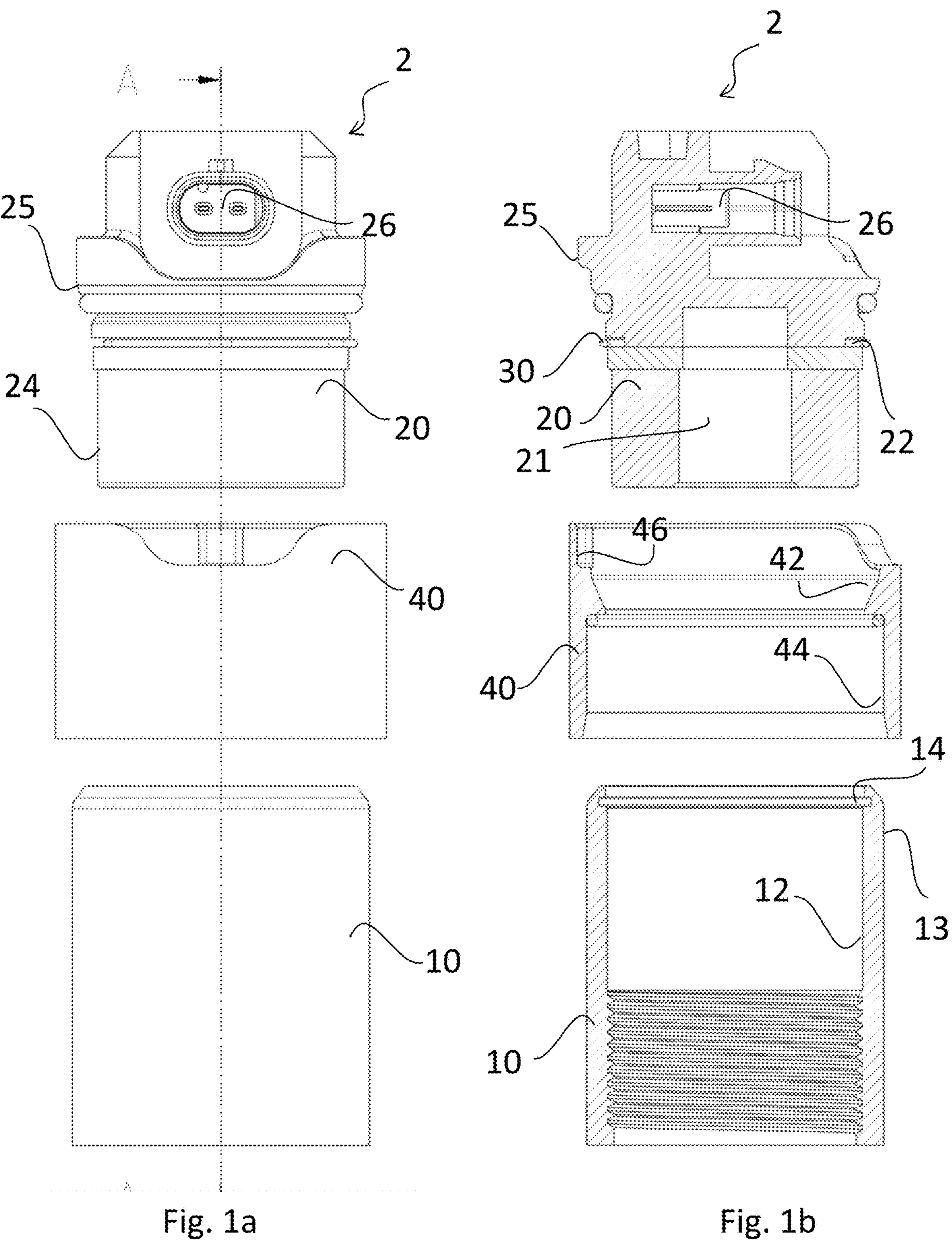
FIG. 1*a* shows a valve assembly according to one embodiment of the invention in an exploded side view, FIG. 1*b* show a valve assembly according to one embodiment of the invention in an exploded view cross-sectional view.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIGS. 1*a*-1*b* show an actively controlled damping valve assembly having a coil assembly 2 according to one embodiment in an exploded side view. FIG. 1*a* is illustrated from a first side, and FIG. 1*b* is a cross-sectional view from the line A-A as depicted in FIG. 1*a*. The coil assembly 2 comprises a coil housing 20 illustrated on the upper portion of the figure. The coil housing 20 has a substantially circular geometry centered around the axis A-A, and an aperture 21 for housing a coil (not illustrated) which may be controlled by an electric controller. Power supply for the coil may be achieved by an electrical socket to which a controller may be connected. The coil housing 20 further comprises an outer surface 24. In the illustrated example the housings outer surface is substantially circular.

A resilient locking member 30 may be arranged onto the coil housing 20. The resilient locking member 30 is illustrated as a locking ring. The locking member has a steady-state diameter or width but may be compressed into a smaller diameter or width. The locking member may have a rounded form, or the form of a polygon with e.g. 4-10 sides.

The locking member may also have a substantially round form, or partly round and partly shaped like a polygonal. The locking member may be flexible made of a flexible material. Alternatively, the locking member may have an aperture in one part which can grow to increase the width or diameter and decrease in order to decrease the width or diameter. The locking member may alternatively have two ends that are overlapping, and wherein a smaller overlap provides a larger width or diameter and a larger overlap provides a smaller width or diameter. The locking member may have any combination of the above mentioned flexibility in material and form. An example of the resilient locking member will be further discussed in relation to FIGS. 3*c* and 3*d*.

The actively controlled damping valve assembly further comprises a valve housing 10, as illustrated in the lower portion of the figure. The valve housing 10 has an inner surface 12 and an outer surface 13. The inner surface 12 of the valve housing is formed and sized to mesh with the outer surface 24 of the coil housing 20. Thus, the inner surface 12 of the valve housing and the outer surface 24 of the coil housing 20 have complementary forms. Moreover, the coil housing 20 comprises an upper outer surface 25 with a slightly wider circular surface, which is formed and sized to mesh with the intermediate member 40 as further discussed below.

In the lower portion of the valve housings inner surface there is a thread for fastening the valve housing to a shock absorber (not illustrated). As an alternative, the thread could be replaced with e.g. welding or crimping the parts to each other.

The actively controlled damping valve assembly further comprises an intermediate member 40 illustrated between the coil housing and valve housing. The intermediate member comprises a guiding projection 42. In the illustrated embodiment the guiding projection is formed by a slanted edge functioning as guiding chamfer for guiding a resilient locking member 30 into a pre-tensioned state, which will be explained in more detail together with FIGS. 3*a* and 3*b*.

The intermediate member has a first 44 and a second 46 inner surface wherein the first inner surface 44 is adapted to abut the outer surface 13 of the valve housing 10 and the second inner surface 46 is adapted to abut the upper outer surface 25 of the coil housing 20. The intermediate member herein functions as a linking bushing that connects the coil housing to the valve housing, and which guides the resilient locking member so that the parts are locked together.

The valve housing comprises valves for controlling the flow of e.g. hydraulic fluid in order to achieve a desired damping characteristic for a shock absorber in a vehicle. As the valves per se are not directly related to the invention they will not be discussed in further detail herein.

Figures 2A, 2B, 2C, 2D:
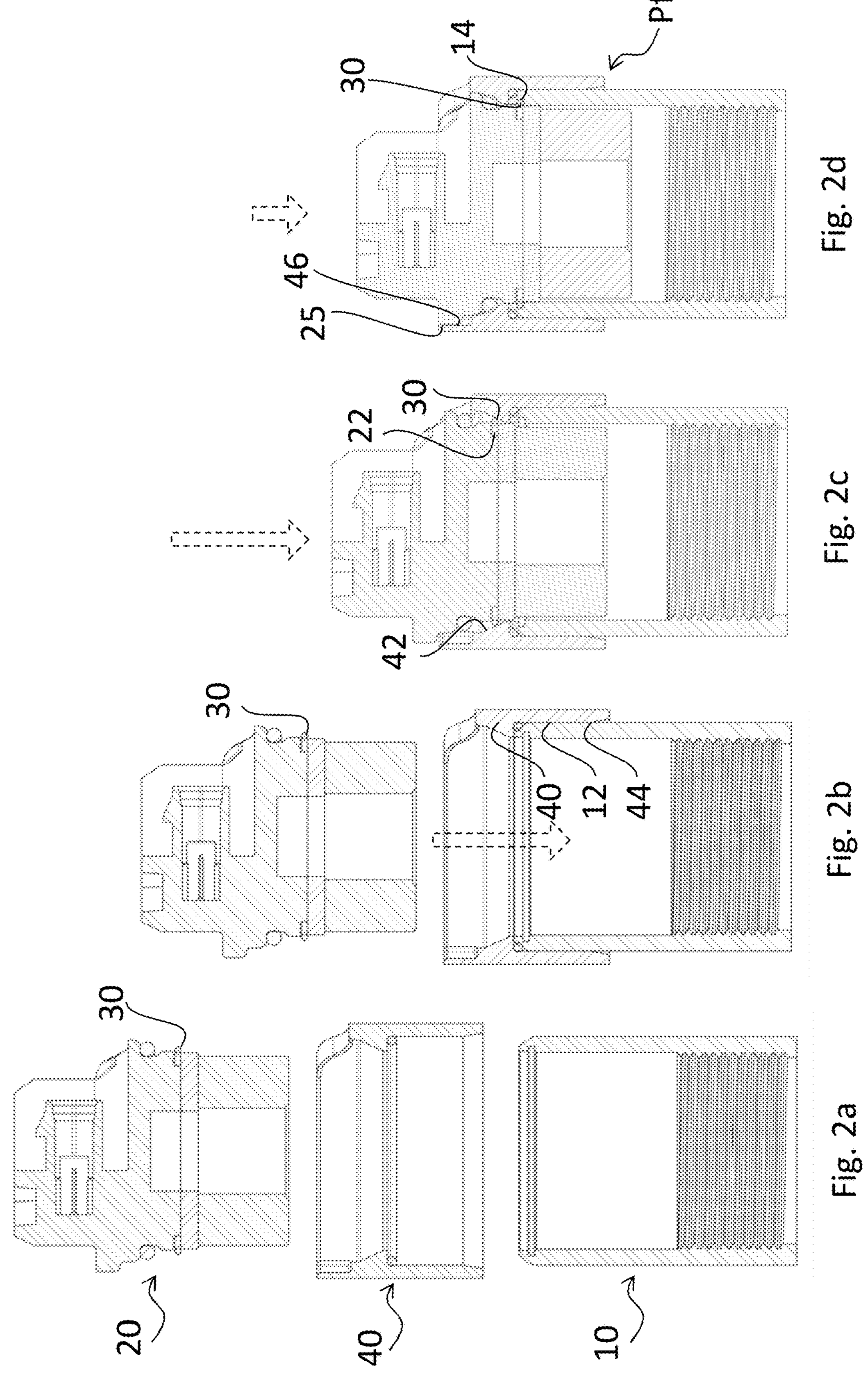
FIGS. 2*a*-2*d* show how the parts of a valve assembly according to one embodiment may be mounted together.

In FIGS. 2*a*-2*d* show how the parts of a valve assembly may be mounted together. In the figures, the valve housing 10 is in a constant position in the lower portion of each figure. In FIG. 2*a* the resilient locking member 30 is arranged onto the coil housing 20 in a steady state with a first width. Moreover, the intermediate member 40 is arranged between, but not in contact with, the coil housing 20 and the valve housing 10. Moving on to FIG. 2*b*, the intermediate member 40 has been moved in a downwards direction as indicted by the dashed arrow, onto the valve housing 10. The coil housing 20 with the resilient locking member is still not in contact with the intermediate member. However, in FIG. 2*c*, the coil housing 20 with the resilient locking member is moved onto the valve housing 10, so that the first inner surface 44 abuts the outer surface 13 of the valve housing 10.

Moving on to FIG. 2*c*. the coil housing is moved, as indicated by the dashed arrow, so that the intermediate member axially overlaps the coil housing 20. Moreover, the resilient locking member 30 is pretensioned along the slanted edge of the guiding projection 42 of the intermediate member, forcing the resilient locking member into a smaller width/diameter than the above-mentioned first width. In the pre-tensioned state, the locking member is accommodated in a pre-tensioning aperture 22 in the coil housing. Hereby, the resilient locking member is resiliently loaded towards the steady state position, meaning that the locking member wants to flex back to the wider width/larger diameter, but is prevented by the guiding projection 42.

Moving on to FIG. 2*d*. the coil housing is further moved into the final mounting position, as indicated by the dashed arrow, so that the second inner surface 46 of the intermediate member 40 abuts the upper outer surface 25 of the coil housing 20. Moreover, the resilient loading member 30 is now brought in axial alignment with the locking aperture 14 in the valve housing 10. When in this position the resilient loading member may expand into its steady-state position so that it enters the locking aperture 14 and locks the parts together.

In the final assembled position, the pre-tensioning aperture 22 of said outer surface of the coil housing is aligned with said locking aperture 14 of said valve housing 10.

Figure 2F:
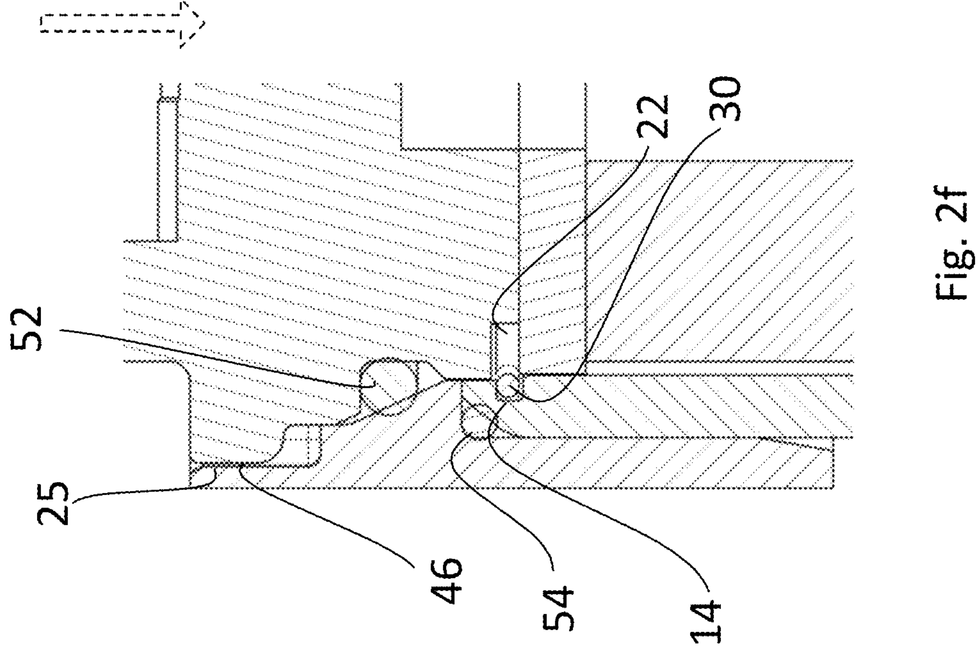
FIG. 2*e*-*f* show a close-up of the interface between the valve housing, intermediate member and coil hosing approaching a mounted position.
Figure 2E:
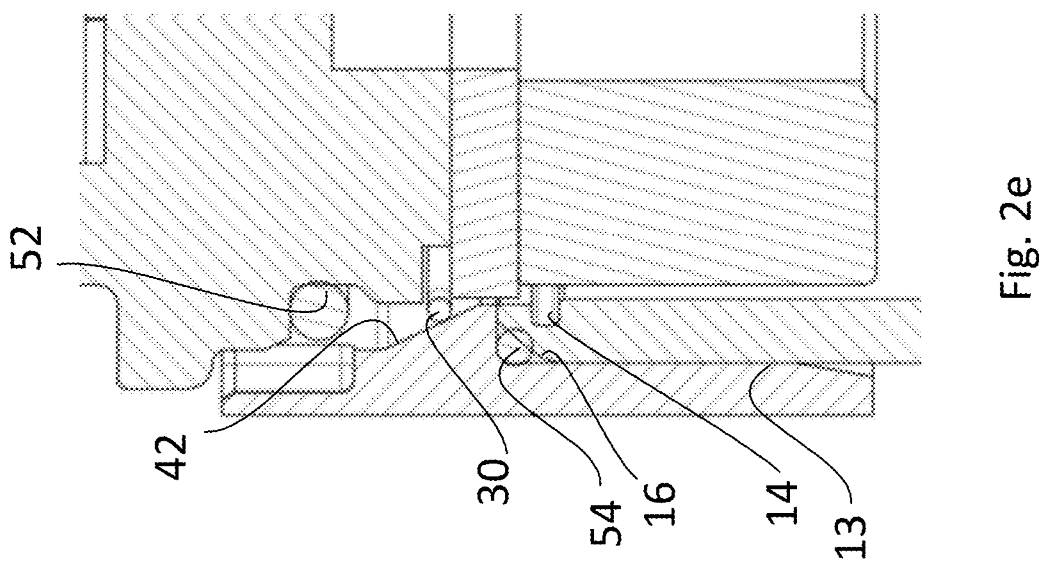

FIGS. 2*e* and 2*f* correspond to a close-up of the interface between the valve housing, intermediate member and coil hosing in the positions as illustrated in FIGS. 2*c* and 2*d*, respectively. The two figures will herein be described in parallel.

In the cross-sectional close ups, the first sealing member 52 is illustrated as an O-ring. Other forms and types of sealing members may be used. The first sealing member should, regardless of its form, function to seal between the intermediate member 40 and the coil housing 20 when the damping valve assembly enter its final position. In the final position, the first seal is preferably slightly deformed to better seal the volume between the coil housing and the intermediate member.

The second sealing member 54 is further illustrated in these figures too. The second sealing member is also illustrated as an O-ring but could be any sealing member in the same way as described above for the first sealing member. The second sealing member should be arranged to seal between the intermediate member 40 and the valve housing 10. In the illustrated example the valve housing has a slightly slanted edge 16 on its outer surface 13, to create a small volume between the valve housing and the intermediate member, where the second sealing member may be accommodated when the valve arrangement is in its final assembled position.

At least a portion of the outer surface of the valve housing may be coated with an anti-corrosion coating, such as cathodic dip coating (KTL). Also, a corresponding portion of the mating inner surface of the intermediate member may be coated with an anti-corrosion coating, such as cathodic dip coating (KTL). This way, the surfaces below the second sealing member, which will be subject to more moist and dirt, will have a resistance to corrosion.

From the close up, it is also clear that the slanted edge constituting the guiding projection 42 of the intermediate member will push the resilient locking member 30 into the pre-tensioning aperture when the coil housing is pressed into the intermediate member.

Figures 3A, 3B:
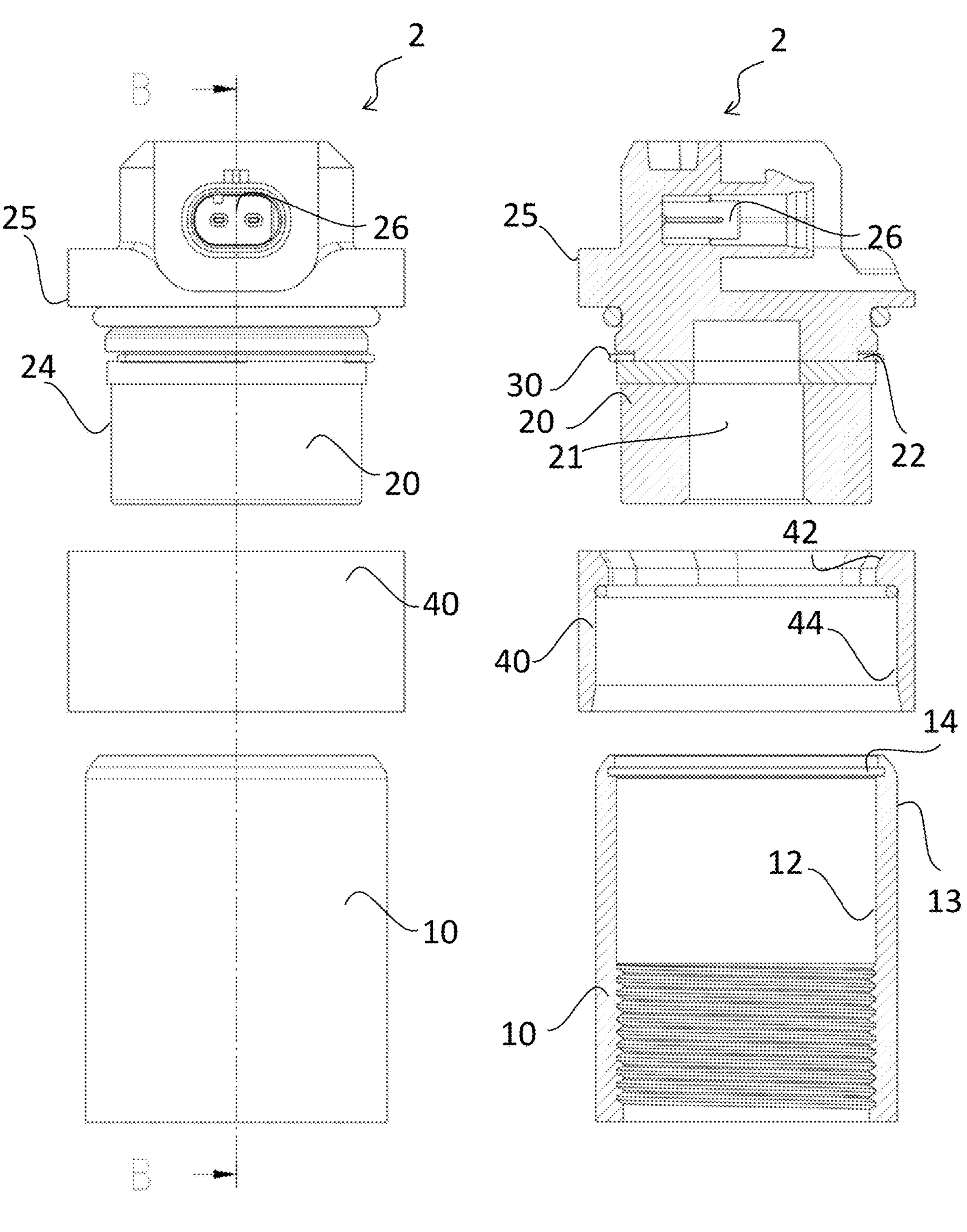
FIG. 3*a* shows a valve assembly according to one embodiment of the invention in an exploded side view, FIG. 3*b* show a valve assembly according to one embodiment of the invention in an exploded view cross-sectional view.
Figures 3C, 3D:
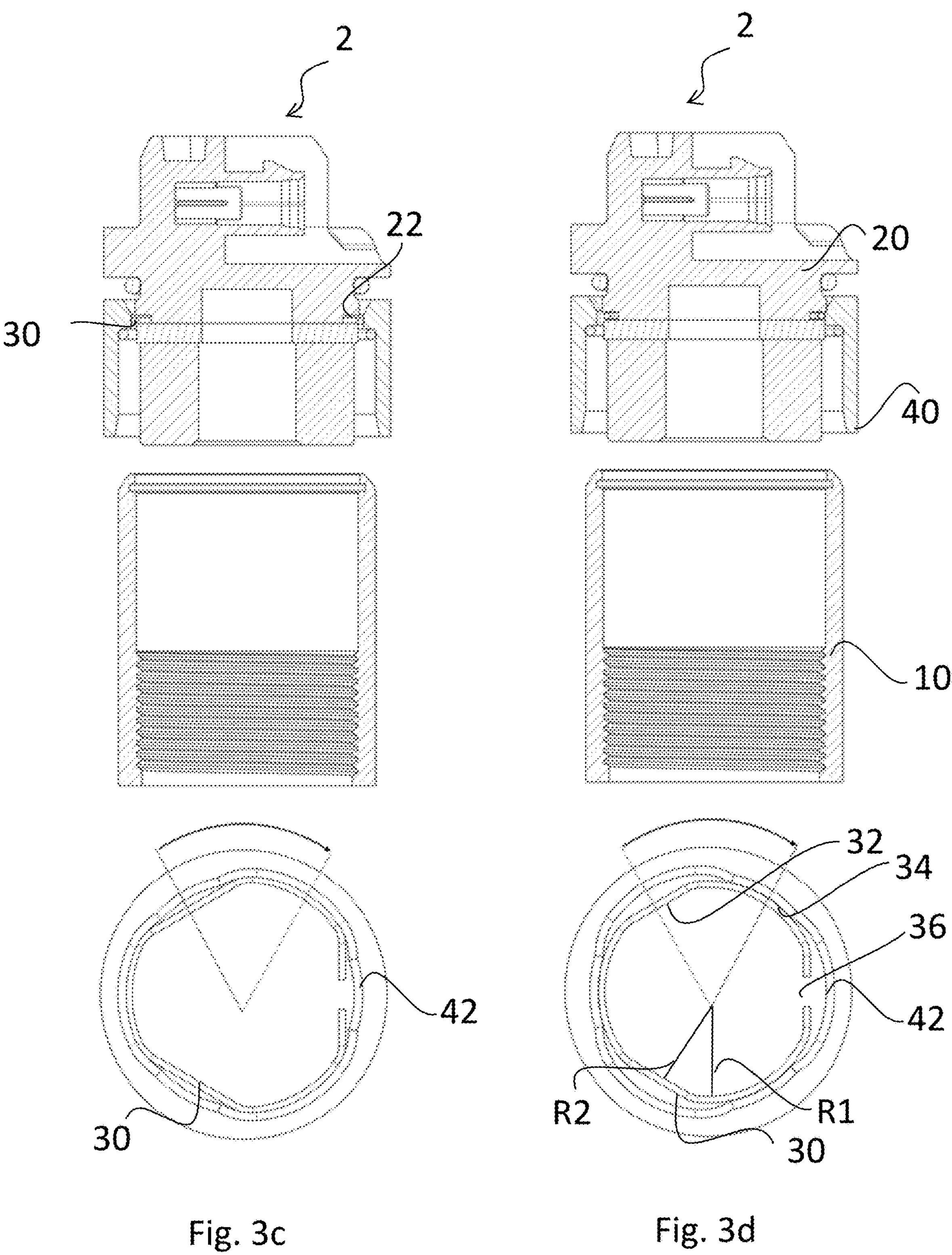
FIGS. 3*c* and 3*d* show how the parts of a valve assembly according to one embodiment may rotated relative each other.

Much like FIGS. 1*a*-1*b*, FIGS. 3*a*-3*d* illustrates an actively controlled damping valve assembly having a coil assembly 2 according to one embodiment in an exploded side view. FIG. 3*a* is illustrated from a first side, and FIG. 3*b* is a cross-sectional view from the line B-B as depicted in FIG. 3*a*. All the major parts like the valve housing 10, coil housing 20, resilient locking member 30, intermediate member 40 are present and in large arranged in the same way in this embodiment. The main difference between the actively controlled damping valve assembly in FIG. 3, as compared to the ones in FIGS. 1*a*-2*f*, is that the intermediate member is designed to not only be axially pressed together to pretension and mount the assembly, but instead, there is an alternative way of pre-tensioning the resilient locking member 30, by rotating the intermediate member relative the resilient locking member. The coil housing 20 still comprise a pre-tensioning aperture 22 for housing the resilient locking member in its pre-tensioned state. Also, the valve housing comprises the locking aperture 14 for receiving the resilient locking member when the arrangement is in the final assembled position. Moreover, the guiding projection 42 which is designed to guiding the resilient locking member 30 into the pre-tensioned state is slightly redesigned in order to cause a pretension upon a rotational movement and not only the axial movement. This will be further explained in FIGS. 4*a*-4*f*. In FIGS. 3*c* and 3*d*, the coil housing 20 is mounted to the intermediate member 40, and the resilient locking member 30 is arranged between the coil housing and the intermediate member. When the intermediate member is rotated (as illustrated by the arrow in the lower portion of the figure) the non-circular design of the guiding projection 42 of the intermediate member pushes the resilient locking member into the pre-tensioning aperture 22 of the coil housing.

The resilient locking member has in the illustrated example a non-circular shape, that is with different radii, where R1 is longer than R2, so as to interact with the shape of the guiding projection's non-circular shape upon rotation.

The resilient locking member 30 has in the illustrated example inner portions 32 with a smaller width (or radius) and outer portions 34 with a larger width (or radius). There may be a plurality of each inner portion and outer portions constituting the resilient locking member. The inner portions may have a concave (inwardly bent) outer surface, whereas the outer portions may have a convex (outwardly bent) outer surface.

The resilient locking member 30 has in the illustrated example also an aperture 36 to allow different widths (or diameter) of the total width of the locking member. In other examples, the change in diameter may be achieved by deformations in the material of the resilient locking member.

FIGS. 4*a*-4*f* show how the parts of a valve assembly according to one embodiment may be mounted together. The figures in large correspond to the FIGS. 2*a*-2*f*, but with the corresponding changes as explained above in relation to FIGS. 1 and 3.

Figures 4A, 4B, 4C, 4D:
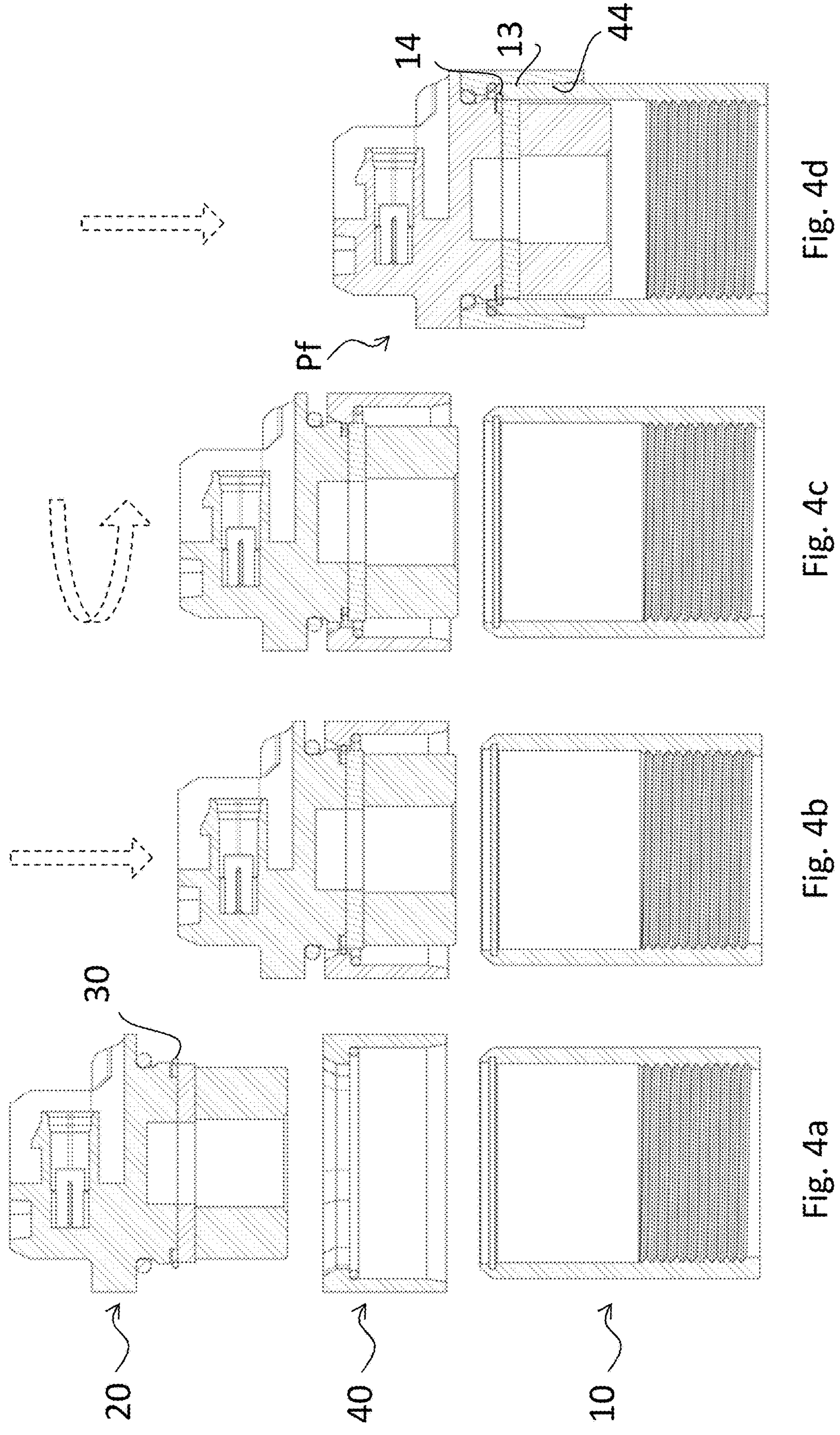
FIGS. 4*a*-4*d* show how the parts of a valve assembly according to one embodiment may be mounted together.

As in FIGS. 2*a*-*d*, the valve housing 10 is in a constant position in the lower portion of each figure. In FIG. 4*a* the resilient locking member 30 is arranged onto the coil housing 20 in a steady state with a first width. Moreover, the intermediate member 40 is arranged between, but not in contact with, the coil housing 20 and the valve housing 10. Moving on to FIG. 4*b*, the coil housing 20 with the resilient locking member is moved downwards into the intermediate member 40, in a direction as indicted by the dashed arrow. In FIG. 4*c*, the intermediate member 40 is rotated relative the coil housing 20 with the resilient locking member, so as to pre-tension the resilient locking member, as explained in more detail above. In FIG. 4*d*, the coil housing and intermediate member is slid onto the valve housing 10, so that the first inner surface 44 of the intermediate member abuts the outer surface 13 of the valve housing 10. Thus, in FIG. 4*d* the coil housing is moved into the final mounting position, where the resilient loading member 30 is brought in axial alignment with the locking aperture 14 in the valve housing 10. When in this position the resilient loading member may expand into its steady-state position so that it enters the locking aperture 14 and locks the parts together.

In the final assembled position, the pre-tensioning aperture 22 of said outer surface of the coil housing is aligned with said locking aperture 14 of said valve housing 10.

Figures 4E, 4F, 4G:
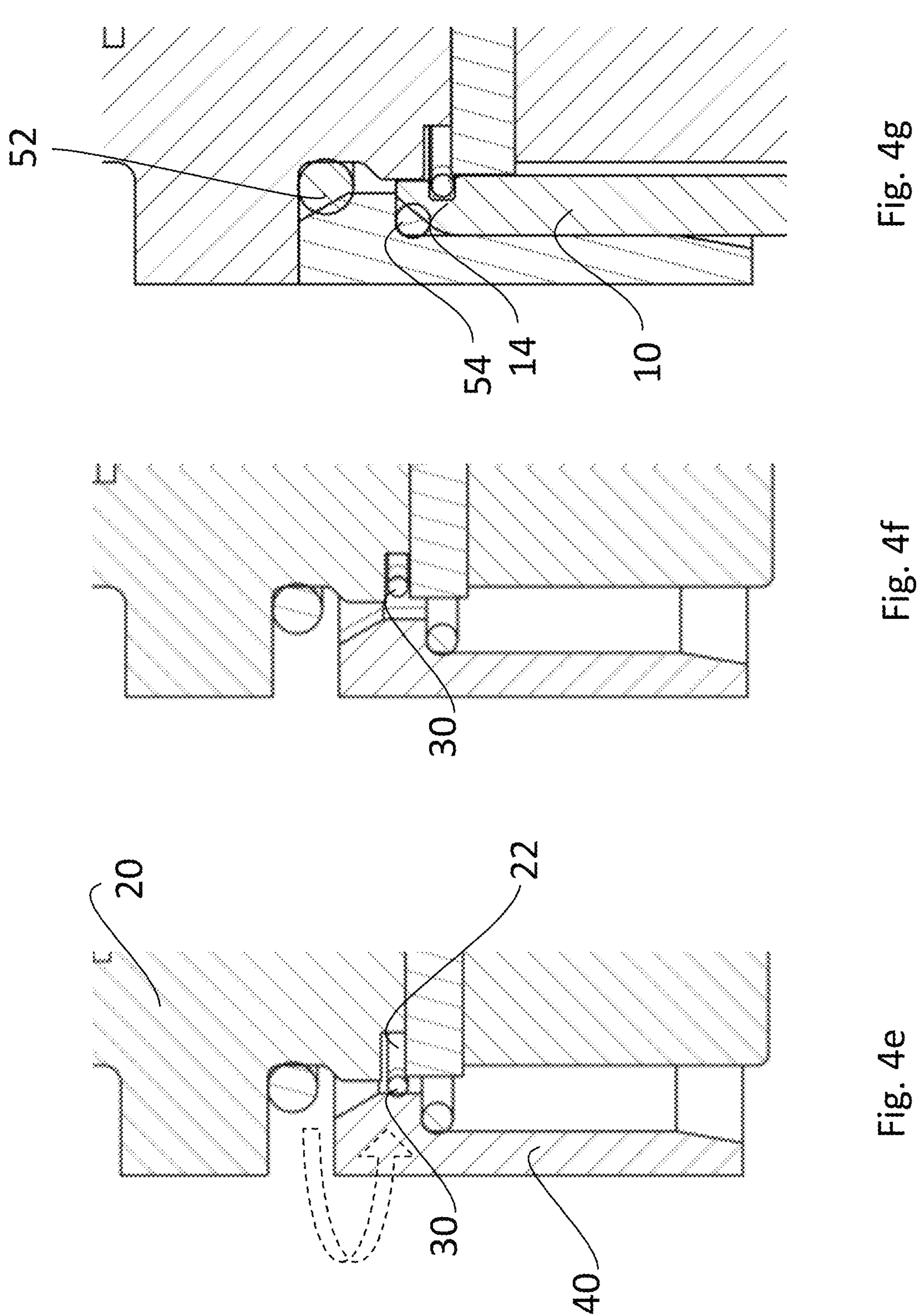
FIG. 4*e*-*g* show a close-up of the interface between the valve housing, intermediate member and coil hosing approaching a mounted position.

FIGS. 4*e*-4*g* correspond to a close-up of the interface between the valve housing, intermediate member and coil hosing in the positions as illustrated in FIGS. 2*b*, 2*c* and 2*d*, respectively. The three figures will herein be described in parallel.

In large, the same description applies to almost all components/parts as described in relation to FIGS. 2*e* and 2*f*. However, the difference is still that the intermediate member is pre-tensioned by means of a relative rotation of the intermediate member 40 relative the resilient locking member 30. Therefore, e.g. the first seal 52 and second seal 54 will not be described further in relation to these figures.

As indicated by the arrow in FIG. 4*e*, the intermediate member is rotated, which causes the resilient locking member to be pre-tensioned and moved into the pre-tensioning aperture 22 of the coil housing 20, as illustrated in FIG. 4*f*. Thereafter, the valve housing 10 is assembled with the other parts, as illustrated in FIG. 4*g*. When the parts are brought into the final assembly position, the resilient locking member 30 may enter the locking aperture 14 of the valve housing as illustrated in FIG. 4*g*.

Figure 5:
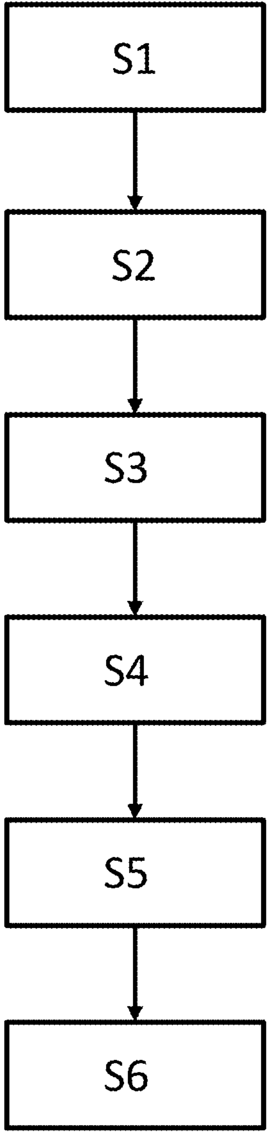
FIG. 5 shows a flow-chart of the method according to one embodiment.

Finally, FIG. 5 schematically illustrates a flow-chart of the method for mounting an actively controlled damping valve assembly, comprising the steps as claimed. The first step is fitting S1 the resilient locking member 30 to the outer surface of the coil housing 20. This step is already performed in each of FIGS. 2*a* and 4*a*, as discussed above. Thereafter, there is a step of inserting S2 the valve housing 10 into the first end of an intermediate member 40 so that an outer surface of the valve housing abuts an inner surface of the intermediate member. This is illustrated in FIG. 2*b*. The method further comprises the step of inserting S3 the coil housing 20 into a second opposite end of the intermediate member 40, which is illustrated in e.g. FIG. 2*c*. Notably, the steps indicated as S2 and S3 above may be performed in the opposite order without deviating from the inventive concept. This is illustrated in FIGS. 4*b* and 4*d*, where the coil housing 20 and intermediate member 40 is first connected (see FIG. 4*b*), and thereafter the coil member together with the intermediate member is inserted into the valve housing 10, as in FIG. 4*d*.

The method further comprises the step of pre-tensioning S4 the resilient locking member 30 into a pre-tensioned state. This is done by moving the resilient member into a pre-tensioning aperture 22 of said outer surface of the coil housing by moving the coil housing relative said intermediate member. This is shown in for example FIGS. 2*c*, 3*d* and 4*c* and described in detail above. It may either be moved by an axial movement or by a rotational movement, or by a combination of the two types of movements.

The method finally includes the steps of axially S5 moving the coil housing 20 relative the valve hosing 10 into a final assembled position Pf, and receiving S6 the resilient locking member 30 into a locking aperture 14 of the valve housing and thereby locking the coil hosing with the valve housing in the final assembled position, as shown in for example FIGS. 2*d* and 4*d*.

The skilled person will understand that any features described in relation to the arrangement is also considered to be disclosed together with the method of assembling the arrangement. Likewise, the opposite also is also apparent, that the features described in relation to the method are also to be considered to be disclosed in relation to the arrangement.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for mounting an actively controlled damping valve assembly, comprising:

fitting a resilient locking member to an outer surface of a coil housing, inserting a valve housing into a first end of an intermediate member so that an outer surface of the valve housing abuts an inner surface of the intermediate member, inserting the coil housing into a second opposite end of the intermediate member, pre-tensioning the resilient locking member into a pre-tensioned state in a pre-tensioning aperture of said outer surface of the coil housing by moving the coil housing relative said intermediate member, axially moving the coil housing relative said valve hosing into a final assembled position, and receiving said resilient locking member into a locking aperture of said valve housing and thereby locking the coil hosing with the valve housing in the final assembled position.

2. The method according to claim 1, wherein said pre-tensioning aperture of said outer surface of the coil housing is axially aligned with said locking aperture of said valve housing in the final assembled position.

3. The method according to claim 1, wherein said step of pre-tensioning the resilient locking member into a pre-tensioned state comprises rotating the intermediate member relative the resilient locking member.

4. An actively controlled damping valve assembly for a vehicle, comprising:

a valve housing with an inner surface, a coil housing with an outer surface for abutting said inner surface of the valve housing, a resilient locking member for locking said valve housing to said coil housing in a final assembled position, and an intermediate member for guiding and pre-tensioning said resilient locking member, wherein said intermediate member comprises a guiding projection for guiding said resilient locking member into a pre-tensioned state in a pre-tensioning aperture of said outer surface of the coil housing when the coil housing is moved relative said intermediate member, and said inner surface of said valve housing comprises a locking aperture for receiving said resilient locking member when said valve housing is axially moved relative said coil housing into the final assembled position.

5. The actively controlled damping valve assembly according to claim 4, wherein the intermediate member is a bushing adapted to axially overlap a portion of the valve housing and a portion of the coil housing.

6. The actively controlled damping valve assembly according to claim 4, wherein the intermediate member comprises a first and a second inner surface wherein the first inner surface is adapted to abut an outer surface of the valve housing and the second inner surface is adapted to abut an upper outer surface of the coil housing.

7. The actively controlled damping valve assembly according to claim 4, further comprising a first sealing member for sealing between the intermediate member and the coil housing.

8. The actively controlled damping valve assembly according to claim 7, wherein the first sealing member is deformed when said valve housing is axially moved relative said coil housing into the final assembled position.

9. The actively controlled damping valve assembly according to claim 4, further comprising a second sealing member for sealing between the intermediate member and the valve housing.

10. The actively controlled damping valve assembly according to claim 4, wherein at least a portion of an outer surface of the valve housing and a portion of a mating inner surface of the intermediate member are coated with an anti-corrosion coating, such as cathodic dip coating.

11. The actively controlled damping valve assembly according to claim 4, wherein the resilient locking member is a locking ring.

12. The actively controlled damping valve assembly according to claim 4, wherein the resilient locking member is rotationally asymmetric.

13. The actively controlled damping valve assembly according to claim 12, wherein the guiding projection has different radii along the circumference of its inner surface, so that said resilient locking member may be pretensioned by a relative rotation between the intermediate member and the resilient locking member.

14. The actively controlled damping valve assembly according to claim 4, wherein the guiding projection is a guiding chamfer for guiding said resilient locking member into a pre-tensioned state into said aperture of said outer surface of the coil housing when the coil housing is axially moved towards said valve housing.

15. A vehicle comprising an actively controlled damping valve assembly according to claim 4.

* * * * *